Feb. 16, 1943.   W. WHITEHEAD   2,311,012
METHOD OF PREPARING STIFFENED FABRICS
Filed Sept. 26, 1939
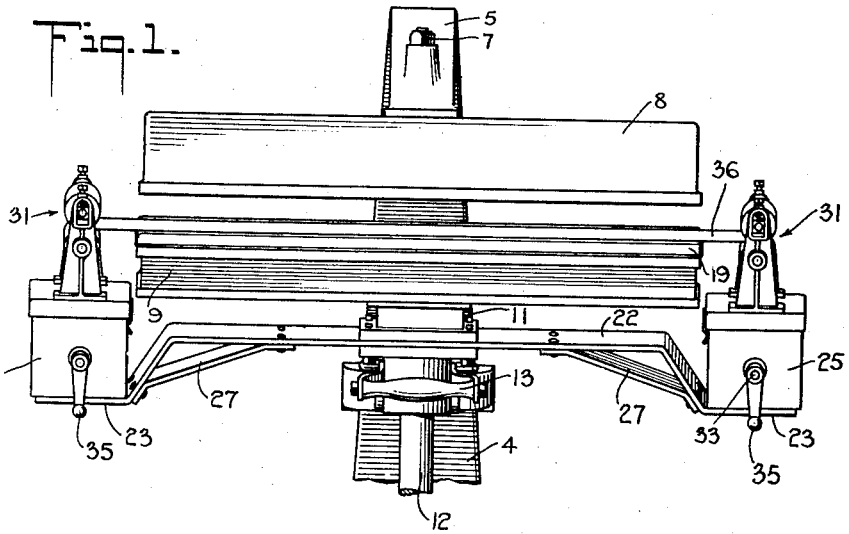
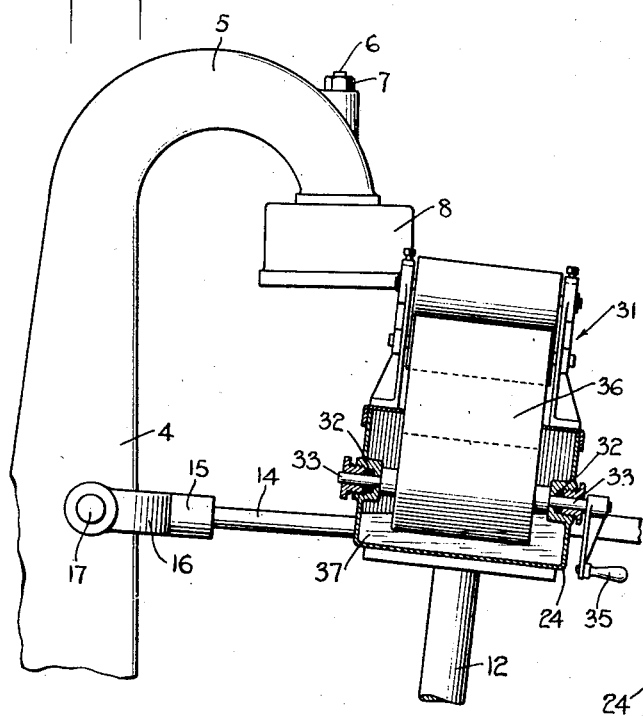
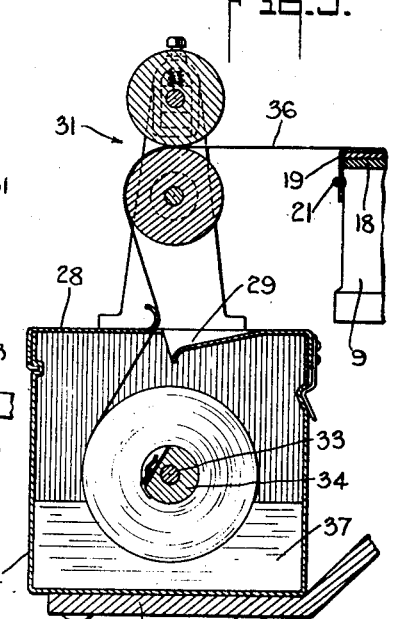
INVENTOR
William Whitehead
BY
ATTORNEYS Patented Feb. 16, 1943

2,311,012

UNITED STATES PATENT OFFICE 2,311,012

METHOD OF PREPARING STIFFENED FABRICS

William Whitehead, Rye, N. Y., assignor to Celanese Corporation of America, a corporation of Delaware Application September 26, 1939, Serial No. 296,575

4 Claims. (Cl. 154—2)

This invention relates to the preparation of stiffened fabrics and to articles of wearing apparel and other technical and other articles made wholly or in part from such stiffened fabrics, and relates more particularly to the production of stiffened fabrics by the use of derivative of cellulose materials.

An object of my invention is to prepare fabrics of any desired degree of stiffness in a simple, economical and expeditious manner. Another object of this invention is to prepare stiffened articles of wearing apparel and the like of laminar structure which are free from wrinkles and other distortions, have good stiffening effects and firm adhesion between the layers comprising the assembly. Other objects of this invention will appear from the following detailed description.

In the making of stiffened fabrics or articles by causing cellulose acetate or other derivative of cellulose to melt or coalesce by operations involving the application of heat and pressure, it had been considered necessary to have present during this operation acetone or other volatile organic solvent for the derivative of cellulose. The use of such volatile organic solvents was found to be objectionable for many reasons. For example, such solvents were not only expensive and often had a disagreeable odor and noxious effect but also their use prevented accurate control of the degree of coalescence desired and consequently the extent of stiffening produced in the article. To overcome the difficulties attendant upon the use of volatile organic solvents, it has been proposed to employ plasticizers for the derivative of cellulose and to laminate and stiffen the article by the application of heat and pressure in the presence or absence of moisture such as water.

In accordance with a prior process for preparing stiffened fabric in which plasticizer for the derivative of cellulose is employed and the hot pressing effected in the presence of water, an assembly comprising a plurality of layers of fabric, at least one of which contains a derivative of cellulose and has a plasticizer for the derivative of cellulose incorporated therewith in any suitabe manner, is wetted on both sides by dipping the same in a bath of water or by spraying the water thereon and subjecting to heat and pressure in a calender, or a press or with a hot iron. This process suffers from the disadvantage that wrinkles and other distortions are formed in the laminated fabric web or article, which wrinkles and distortions are substantially permanent or have a permanently undesirable effect. Also the surface of the fabric is given an undesirable glaze, frequently patchy.

I have found that laminated and stiffened fabric webs and articles free from wrinkles and distortions may be formed by applying the moisture or water to the assembly in a definite and controlled manner. In accordance with my invention I apply the moisture or water to the assembly of fabrics, at least one of which contains a derivative of cellulose and a plasticizer therefor, so that there is little or no penetration of the moisture or water to that layer of fabric which is to be the exposed layer in the finished article until the assembly is actually under pressure. To carry out my invention I place the assembly of fabrics, with the layers to be exposed in the finished product facing upward, on a water-wet surface and then apply heat and pressure to the assembly and the wet surface. The heat causes at least some of the water to be generated into steam which passes through the layer containing the derivative of cellulose and plasticizer therefor causing the same to become adhesive so that it may be united readily to the other layer or layers of fabric comprising the assembly under the action of pressure.

The surface adapted to supply the necessary moisture, and upon which the assembly to be laminated is adapted to be placed, may be formed of any suitable material. For example, the surface may be formed of cotton broadcloth where comparatively thin articles, such as collars, are laminated and stiffened, and of thicker cloth where heavier articles are operated upon. In the preferred embodiment of my invention I wet the cotton cloth by dipping the same in water, and wringing it so that it is damp but not wringing wet and then place the damp or wet cloth on the buck of a pressing machine. I then position the assembly of fabrics to be laminated and stiffened on the wet cloth so that then a layer which is not to be exposed in the finished product is in contact with the damp cloth, after which heat and pressure is applied to the assembly. When removed from the press, the layers comprising the assembly are found to be firmly adherent to each other and free from wrinkles and distortions. However, for certain purposes, as for producing moire effects on the surface of the finished article, the wet cloth may be placed in contact with said exposed surface and heat and pressure applied thereto.

However, instead of employing a wet or damp cloth, I may apply a controlled amount of moisture on the cloth cover of the buck of the pressing machine, as by spraying or by any other suitable means.

The process of my invention yields laminated products which have substantially twice the adhesion of and are much more resistant to laundering than products obtained by prior processes.

Products formed by this invention may be used for any purpose where a stiffened and/or relatively more or less impermeable fabric is desired. An important application of such products is wearing apparel which may be formed wholly or in part of fabrics made or prepared in accordance with this invention. Thus, collars or cuffs may be formed entirely of the product of this invention. Alternatively, shirts may be made wherein attached collars, neck bands, cuffs, fronts or bosoms are made of such products. Hats or parts of hats may likewise be formed of such material as may also be the inner of sweat bands of hats, visors for caps, cuffs of gauntlets, inner linings of cravats, stiffening material used in the inner portions of garments, such as coats, to help retain the shape thereof, etc. The fabric of this invention may be used for a variety of other purposes and indeed may be used for any industrial or technical purpose where fabric of increased stiffness and/or more or less impermeability is required.

The adhesive or inner layer or layers of fabric may be a fabric formed of yarns of a derivative of cellulose or substantially of a derivative of cellulose. Further, the adhesive or inner layer or layers of fabric may be a fabric formed of non-thermoplastic yarns, which fabric has been coated or impregnated with a derivative of cellulose, for instance, by coating the fabric with an aqueous slurry of a finely divided powder comprising a derivative of cellulose. Any suitable amount of a derivative of cellulose may be present in the inner layers, it being important, however, that a sufficient amount be present to furnish the adhesive to cause the layers of fabric in the assembly to adhere to each other.

In order that the desired degree of stiffening and adhesion be attained upon the heat pressing in the presence of water, it is of importance that there be present in the assembly being treated a plasticizer of relatively high boiling or non-volatile solvent for the cellulose acetate or other derivative or cellulose employed in the inner layers of adhesive layers of the composite material. This plasticizer may be caused to be present in any manner. Thus, the plasticizer or high boiling solvent for the derivative of cellulose employed in the fabric of the inner layer may be applied to or incorporated in the fabric of the inner layer preferably by passing the fabric containing the derivative of cellulose through a solution of plasticizer, by padding the plasticizer on such a fabric or by spraying onto the fabric a solution of such a plasticizer in a volatile solvent. However, the plasticizer may be incorporated in the inner or adhesive fabric by adding the plasticizer to the spinning solution from which the yarns are formed, when employing fabrics formed of yarns containing a derivative of cellulose, or by incorporating the plasticizer with the derivative of cellulose powder or other form of coating material when employing a non-thermoplastic fabric that has been coated with a derivative of cellulose.

Any suitable plasticizer may be employed, which plasticizer may or may not be soluble in water. Examples of suitable plasticizers for cellulose acetate are dimethyl phthalate, dibutyl phthalate, diethyl tartrate, dibutyl tartrate, triacetin, etc. The amount of plasticizer present is preferably relatively large and on the order of from less than 40 per cent to 150 per cent or more of the weight of the derivative of cellulose present in the inner layers of fabric that are to bind together the outer layer or layers of fabric containing a derivative of cellulose.

In one form of this invention the assembly of fabrics, with an intermediate layer of a fabric containing non-thermoplastic fibers, for instance, cotton, wool, silk, etc., that contains padded or impregnated thereon or therein a substantial amount of a derivative of cellulose and plasticizer may first be cut, sewn or otherwise shaped and the assembly then pressed to lend stiffness and adhesion to said assembly. For instance, after the desired article such as collars, cuffs or other wearing apparel or parts thereof comprising an inner fabric that is in touching relation to the fabrics containing a derivative of cellulose are formed, a plasticizer and a substantial amount of a derivative of cellulose being present on the inner fabric, the articles may then be treated with water and subjected to heat and pressure to impart the desired stiffness and/or impermeability. In this manner the sewing of stiffened material is avoided.

In another form of this invention the assembly of fabrics that contain exposed or outer layers of a fabric containing a derivative of cellulose and an intermediate layer of a fabric containing yarns of a derivative of cellulose and a plasticizer incorporated therewith or thereupon, may be cut, sewn or otherwise shaped and the assembly then pressed to lend stiffness and adhesion to said assembly. For instance, after the desired articles, such as collars, cuffs, or other wearing apparel or parts thereof are formed, an inner layer that contains a plasticizer and yarns of a derivative of cellulose being present, the articles may be treated with water and then subjected to heat and pressure.

Products of this invention have any desired degree of stiffness which is relatively permanent so that they may be subjected to repeated laundering without substantially losing their stiffness and/or their adhesion or lamination of each layer to the other. In this manner the use of starch or other extraneous stiffening material during laundering may be avoided. As the composite material is preferably formed with the outer layers of fabric being of yarns of filaments containing a derivative of cellulose, there is a decided advantage in lending stiffness and coalescence to the article without the aid of extraneous material, as such material could show as a gloss on the laundered article which might mar the unique effect of color, texture and appearance of the derivative of cellulose fabric.

This invention may be carried out in a large number of ways, particularly as to the nature of the fabric or number of fabrics employed, provided that fabrics containing yarns of derivatives of cellulose are contained in the composite material as the outer layers and also that in juxtaposition thereto is a fabric containing yarns of derivatives of cellulose and a plasticizer or a non-thermoplastic material containing a coating or impregnation of a derivative of cellulose and a plasticizer for the thermoplastic material of the inner or adhesive layers. For instance, the composite material such as a collar for a shirt may be formed by shaping the collar of a material made of yarns or filaments of derivatives of cellulose containing a liner of fabric formed of derivatives of cellulose that have been padded with a substantial amount of a plasticizer for the said derivative of cellulose.

This invention is not only applicable to laminated or composite articles wherein the outer layers of fabric contain only yarns or filaments of derivatives of cellulose. It is applicable also to composite articles that have an exposed fabric wherein the yarns or filaments of a derivative of cellulose predominate. For instance, fabrics may be employed in which yarns of a derivative of cellulose alternate with non-thermoplastic yarns either in the warp or in the weft or both in any desired degree of alternation. This alternation may be, for instance, 1, 2, 3 or more cellulose acetate yarns with 1, 2, 3 or more yarns of cotton or other non-thermoplastic fibers. For convenience the outer layers of fabric may be formed such that the warp may be made with such alternation of a derivative of cellulose yarn and yarn of other fibers, while the weft may consist wholly of such derivative of cellulose yarn or wholly of yarn of other fibers. If desired, a fabric may be used as the outer layer in which either the warp or weft consists wholly of cellulose acetate yarn, while the intermediate layers of fabric consist of any suitable fabric containing sufficient derivative of cellulose and plasticizer to cause an adhesion of the layers of fabric to each other upon heat pressing in the presence of water. Adhesion effected under these conditions results in no alternation of the layers since the plasticizer on the inner layers causes the derivative of cellulose of only the inner layers to soften, swell or otherwise cause the adhesion of the various layers.

Any type of fabric woven from yarns containing derivatives of cellulose may be employed as the outer layers, which expedient gives rise to many novel effects that may be produced in stiffened fabrics. For instance, taffetas, satins, plushes, velvets or any other type of fabric may be employed, which fabrics may be woven, knitted or netted. All exposed yarns, whether of derivative of cellulose or other materials, are left unaltered in both appearance and hand.

The yarns or filaments which are employed to form the fabric may be made of any suitable derivative of cellulose, for instance, the esters of cellulose and cellulose ethers. For example, the esters of cellulose may be cellulose nitrate, cellulose formate, cellulose acetate, cellulose propionate and cellulose butyrate, while examples of cellulose ethers are ethyl cellulose, methyl cellulose and benzyl cellulose. Furthermore, the same or different derivatives of cellulose may be employed with a plasticizer to form the adhesive material of the inner or non-exposed adhesive layers. Mixed cellulose esters may also be employed in the process such as, for example, cellulose aceto-propionate and cellulose acetobutyrate.

To further illustrate my invention but without being limited thereto, reference is had to the accompanying sheet of drawings wherein Figure 1 is a front elevational view of the pressing head of a pressing machine showing attached thereto a device for supplying a wet cloth to said pressing head, Figure 2 is a side elevational view, partly in section, of the same on a slightly enlarged scale, and Figure 3 is a sectional view on an enlarged scale showing the interior of one of the chambers for housing and wetting the cotton duck or canvas.

Like reference numerals indicate like parts throughout the several views of the drawing.

Referring to Figure 1, the reference numeral 4 indicates the standard of a pressing machine having a goose neck 5 to the end of which is attached, as by a bolt 6 and a nut 7, a head 8. This head is provided with a highly polished contact surface which may be heated in any suitable manner as by steam, gas or electricity. In the pressing machine shown in the drawing the head 8 is stationary and a buck 9, also heated, is movable relative thereto. The buck is mounted on a small platform or support 11 carried on the upper end of a lever 12 which is rockably supported on a toggle arrangement, not shown, which is adapted to apply pressure during the pressing operation, as is well understood in the art. The buck 9 is pushed by means of a handle 13 underneath the head 8 and pressure is applied, as by means of a foot lever or any other suitable means, which operates the toggle to force the lever 12 in an upward direction. When the pressing operation is over, the buck is pulled away from under the head 8 by handle 13, the buck being retained in position before the machine by a rod 14 held in sliding engagement with an apertured boss 15 in a clevis 16 which is pivotally mounted at 17 on the standard 4. The top surface of the buck may be provided with a yielding surface 18 covered with a layer of cotton cloth 19 held in position by a wire or cord 21.

Means are provided for conveniently supplying wet or damp cloth to the press head. Such means comprise a web 22 of iron, steel or any other suitable material, which web is carried by support 11 and is bent at its free ends to form platforms 23 on which chambers 24 and 25 are fastened as by bolts 26. Braces 27 are attached to the metal web for reinforcing the same.

The chambers 24 and 25 are each provided with a removable cover 28 having an opening 29 therein for a purpose hereinafter set forth. The cover also acts as a support for a pressure roller arrangement generally indicated by reference numeral 31, which insures that only the requisite amount of moisture is carried by the cloth. Mounted in bearings 32 set in the walls of each chamber is a shaft 33 having thereon a roller 34. One end of each of the shafts 33 extends a few inches beyond the chamber wall and bearing to support a crank handle 35 fixed thereto in any suitable manner. A web 36 of cotton cloth is attached to and adapted to be rolled upon rollers 34.

The operation of the device is as follows: The cloth is rolled upon one roller 34 in, say, chamber 24, which is partly filled with water as is shown at 37, passed through opening 29 in chamber 24, threaded through pressure rollers 31—31, through opening 29 in chamber 25 and attached to the roller 24 in said chamber 25. After each pressing operation the operative turns the crank handle 35 of chamber 25 until a suitable length of wet or damp cloth is pulled from chamber 24. The article to be laminated and stiffened is now placed upon the damp cloth with the surface not to be exposed in the finished article in contact with the wet or damp cloth. The buck 9 is then pushed underneath the head 8 by means of handle 13 and pressure is applied by forcing the buck, wet or damp cloth and the article operated upon against the polished surface of head 8. After the pressing operation the buck is lowered and pulled from under the head 8, a new length of wet or damp cloth is drawn from chamber 24 and the steps are repeated. It will be understood that the drawing of the cloth may be effected either from chamber 24 or from chamber 25. It is also to be understood that automatic means may be provided for drawing the cloth from the respective chambers.

It is to be understood that the foregoing detailed description and drawing is given merely by way of illustration and that many variations may be made therein without departing from the spirit of my invention.

Having described my invention, what I desire to secure by Letters Patent is:

1. Process for the production of stiffened fabrics, which comprises superposing an assembly of fabrics, comprising two woven cellulosic fabrics with an intermediate layer of fabric containing a cellulose derivative having a plasticizer incorporated therewith, on a damp surface with the layer of fabric to be unexposed in the finished article in contact with said damp surface, and then applying heat and pressure to the assembly whereby lamination and stiffening of the fabrics are effected.

2. Process for the production of stiffened fabrics, which comprises superposing an assembly of fabrics, comprising two woven cellulosic fabrics with an intermediate layer of fabric containing cellulose acetate having a plasticizer incorporated therewith, on a damp surface with the layer of fabric to be unexposed in the finished article in contact with said damp surface, and then applying heat and pressure to the assembly whereby lamination and stiffening of the fabrics are effected.

3. Process for the production of stiffened fabrics, which comprises superposing an assembly of fabrics, comprising two woven cellulosic fabrics with an intermediate layer of fabric containing a cellulose derivative having a plasticizer incorporated therewith, on a water-dampened cloth surface with the layer of fabric to be unexposed in the finished article in contact with said water-dampened cloth surface, and then applying heat and pressure to the assembly whereby lamination and stiffening of the fabrics are effected.

4. Process for the production of stiffened fabrics, which comprises superposing an assembly of fabrics, comprising two woven cellulosic fabrics with an intermediate layer of fabric containing cellulose acetate having a plasticizer incorporated therewith, on a water-dampened cloth surface with the layer of fabric to be unexposed in the finished article in contact with said water-dampened cloth surface, and then applying heat and pressure to the assembly whereby lamination and stiffening of the fabrics are effected.

WILLIAM WHITEHEAD.